United States Patent [19]

Adams et al.

[11] 4,039,693

[45] Aug. 2, 1977

[54] PROCESS FOR PREPARING FLAVORED ICE DRINK

[75] Inventors: Donald James Adams, Rushden, England; Horst Kieninger, Hamburg, Germany; John Richard Ravenhill, Stevenage, England; Dieter Ries; Karin Schmeling, both of Hamburg, Germany

[73] Assignee: Thomas J. Lipton, Inc., Englewood Cliffs, N.J.

[21] Appl. No.: 582,435

[22] Filed: May 30, 1975

[30] Foreign Application Priority Data

| May 31, 1974 | United Kingdom | 24273/74 |
| May 31, 1974 | United Kingdom | 24274/74 |
| Oct. 3, 1974 | United Kingdom | 42984/74 |
| Oct. 3, 1974 | United Kingdom | 42985/74 |

[51] Int. Cl.$^2$ ............................................. A23G 9/00
[52] U.S. Cl. .................................... 426/565; 426/569; 426/590
[58] Field of Search ............... 426/565, 569, 590, 115

[56] References Cited

U.S. PATENT DOCUMENTS

| 2,651,575 | 9/1953 | Talburt et al. | 426/565 |
| 3,345,185 | 10/1967 | Pisani et al. | 426/565 |
| 3,615,718 | 10/1971 | Weinstein | 426/565 |

FOREIGN PATENT DOCUMENTS

| 1,331,518 | 9/1973 | United Kingdom | 426/565 |
| 1,313,807 | 4/1973 | United Kingdom | 426/590 |

OTHER PUBLICATIONS

Arbuckle, "Ice Cream", The Avi Publishing Co., Inc. Westport, Connecticut, 1972, pp. 292-302.
Sommer "Theory and Practice of Ice Cream Making" The Olsen Publishing Co. Milwaukee, Wis. 1951 pp. 547-556.

*Primary Examiner*—Raymond N. Jones
*Assistant Examiner*—C. A. Fan
*Attorney, Agent, or Firm*—Brumbaugh, Graves, Donohue & Raymond

[57] ABSTRACT

Cold flavored drinks are prepared by adding for instance water to a flavored water ice with an overrun greater than 50%. The water ice can conveniently be extruded into and frozen in a drinking receptacle; on adding water a cold drink is obtained conveniently.

9 Claims, No Drawings

PROCESS FOR PREPARING FLAVORED ICE DRINK

The invention relates to the preparation of cold drinks from frozen concentrates and to frozen concentrates useful in the preparation of cold drinks.

Products for use in the preparation of cold drinks can be based on frozen flavored concentrates. The concentrate can be wholly or, more usually, partly frozen. GB No. 1,331,518 describes the preparation of such a slush beverage concentrate which an, see page 7 lines 62 to 69 and lines 104 to 111, be scooped out and diluted with milk or water to give a cold drink.

The present invention provides a product and process by which a cold flavoured drink can be prepared in a particularly convenient way. It has been found that a cold flavoured drink, can be made simply by adding an aqueous liquid eg water to high-overrun water ice. The high-overrun has the result that there is comparatively little change of volume on addition of the aqueous liquid. This property manifests itself particularly interestingly when the high-overrun water ice fills a drinking receptacle almost to drinking level. The overrun should be greater than 50%.

The invention therefore provides a process for preparing a cold flavoured drink by adding an aqueous liquid to a frozen flavoured concentrate characterised in that the frozen flavoured concentrate is a water ice with an overrun greater than 50%. It further provides a drinking receptacle containing flavoured water ice with an overrun greater than 50%.

Ice confections, for example ice cream, milk ice, sherbet and ices, are usually classified according to their fat, non-fat milk solid, sugar, stabiliser and emulsifier contents. This invention is concerned with those ice confections that lose their structure rapidly particularly when aerated, on melting of their ice content, which are here termed "water ices"; these include conventional water ices and sherbets with very low fat content. Normally the water ice will contain not more than 1% of emulsified fat and less than 0.5% of protein.

Ice confections, including water ices, often contain a dispersed (as distinct from a dissolved) gas phase, normally air, and the amount of such gas phase is expressed as the overrun. Overrun (%) is defined as $$100 \times \left( \frac{\text{weight of unaerated composition of a given volume}}{\text{weight of aerated composition of the same volume}} - 1 \right)$$

Ice cream commonly has an overrun of from 90 to 120, whereas ices and sherbets generally have overruns of from 0 to 45, and manufacturers, limit overrun in order to avoid a defect known as "snowy body". Thus Arbuckle, *Ice Cream* (AVI Publication Corp), 2nd Ed, 1972, page 301, in discussing overrun in sherbets and ices, states that overrun should be kept between 25 and 30% for fat-free water ices and between 35 and 45% for sherbets. Nevertheless water ices with overruns greater than 50% have been described eg in Table B of GB 1,313,807 and in Food Engineering 1962, pages 97 to 100 particuarly page 98; the latter water ice is heavily stabilized.

To ensure that the ice in the water ice is melted reasonably easily by the addition of the aqueous liquid, the overrun of the water ice is preferably at least 165%. For ease of processing and to ensure that the cold drink contains sufficient of such ingredients as flavours, the overrun of the water ice is preferably not more than 250%.

Flavoured cold drinks usually contain sugar and therefore the high-overrun water ice used in the present invention preferably contains sugar. The presence of sugar helps ensure that the added aqueous liquid is readily absorbed by the water ice.

A problem that can occur with a drinking receptacle containing high overrun water ice is that the water ice can tend to collapse on storage, particularly when subjected to mechanical shock or fluctuating storage temperatures. It has been found that this effect can usefully be reduced in a number of ways.

First, it has been found that the stability of the high-overrun water ice can be improved by including, by weight, high levels of sugar in the water ice. For sucrose the preferred minimum is 25%, by weight. The maximum amount of sucrose will be, by weight, about 40%, preferably 35%; above these levels it becomes difficult to obtain a product with adequate ice concentration under normal refrigerated storage conditions. These limits, 25%, 35% and 40%; are a useful general guide for sugars other than sucrose.

The high-overrun water ice conveniently will contain a foam stabilising agent and, although less important, usefully also a whipping agent; in some case one compound can function both as a whipping agent and a stabilising agent. Reference can be made to such standard work as Arbuckle, see above, and Glicksman, Gum Technology in the Food Industry, Food Science and Technology, New York and London, 1969 for details of suitable agents. However it is a surprising feature of the present invention that a second way of reducing the stability problem with high-overrun water ices in drinking receptacles is to reduce the level of stabiliser to, by weight of the water-ice, 0.04% to 0.07%. A further feature is that locust bean gum and in particular guar gum have been found to be preferred stabilisers.

The faster the high-overrun water ice absorbs an aqueous liquid the more convenient the product is in use. It has been found that use of monosaccharide, in particular fructose, instead of part of the sucrose normally used to sweeten drinks increases the ease with which aqueous liquid is absorbed by high-overrun water ice. A preferred high-overrun water ice contains invert sugar as a convenient source of fructose. The amount of glucose, by weight of total sugar, should preferably not exceed 27% otherwise the high-overrun water ice loses stability. The amount of invert sugar should be chosen so that this limit on the amount of glucose is not exceeded. A suitable mixture of sugars is a 2:3 mixture of invert sugar and sucrose.

To improve the flavor of the product it will often be desirable to incorporate an oil, for instance a flavour oil, in the high-overrun water ice. By an oil is meant a hydrophobic material that is substantially liquid at +20° C. Oil has the major disadvantage that it reduces the stability of the product even when the oil has been homogenised in the water ice mix; shrinkage tends to occur and also liquor tends to separate out from the water ice. This is particularly severe when the oil is liquid at −5° C. However it has surprisingly been found that the effect of oil on the stability of the high-overrun water ice is markedly reduced if a protein is included in the water ice mix. The weight ratio of protein to oil should preferably be in the range 1:1 to 3:1. Preferred proteins are sodium caseinate, whey and partially hydrolysed proteins, in particular hydrolysed milk proteins sold under the trade name Hyfoama DS.

Eiskaffee is a product well-known for instance in Germany. It is normally prepared by restauranteurs and consists of a drink of strong, black, sweetened coffee on which floats a portion of normal ice cream. As discussed above an object of the present invention is to provide a more convenient way of preparing cold drinks than the conventional. This is illustrated in the preferred form of the invention when it provides a process and product for preparing Eiskaffee: a composite product is provided consisting of a drinking receptacle filled with a coffee-flavoured water ice containing a discrete portion of ice cream. The restauranteur or housewife merely has to add to water to get Eiskaffee. Soluble solids of coffee, conveniently in the form of instant coffee, can for instance be used to flavour the water ice. A surprising feature of this aspect of the present invention is that the water-soluble solids of coffee act as a foaming agent. The amount of water-soluble solids of coffee is preferably more than 4%; a maximum amount will depend on taste but usually will be about 12%.

Coffee oil can be used to improve the quality of the product. When using oil, homogenisation and use of protein are important as mentioned above. To improve water absorption by the water ice the portion of ice cream should not cover the surface of the water ice in the drinking receptacle and preferably should have channels for instance round the edge of the portion as when a rosette-shaped portion is used.

Conventional equipment and processing conditions can be used in the preparation of the water ice for use in the process and product of the invention although low shear conditions on the dasher or mutator are preferably used for incorporating the overrun. The water ice is preferably extruded directly into a drinking receptacle and then frozen.

The invention will now be illustrated by the following examples. Percentages are by weight except for overrun.

EXAMPLE 1

A mix with the following composition was aerated to 200% overrun, extruded into beakers and frozen:

|   | % |
|---|---|
| Instant coffee | 5 |
| Sucrose | 32 |
| Guar gum | 0.05 |
| Water to 100 | |

A small scoop of conventional ice cream was placed on top of the frozen coffee-flavoured water ice.

On addition of water to this composite product Eiskaffee was obtained.

EXAMPLE 2 to 10

Table 1 shows the stabilisers and amounts of the stabilisers used in each Example. In each Example a mix of the following composition was aerated to 200% overrun, and extruded into beakers and then frozen.

|   | % |
|---|---|
| Instant coffee | 5 |
| Sucrose | 25 |
| Stabiliser | See Table 1 |
| Water to 100 | |

TABLE 1

| Example | 2 | 3 | 4 | 5 | 6 | 7 | 8 | 9 | 10 |
|---|---|---|---|---|---|---|---|---|---|
| Stabiliser | Guar | Gum | | LBG* | | | Gelatin | | 200 |
| Amount % | 0.05 | 0.1 | 0.2 | 0.05 | 0.1 | 0.2 | 0.05 | 0.1 | 0.2 |

*Locust Bean Gum

The products were stored at −10° C for 1 week. Stability was assessed in particular by noting surface deterioration and crack-formation. The results were, in decreasing order of stability: Examples 2,5,3,6=8,9,4=7,10. Example 2 had the further advantage over Example 5 that it absorbed water more rapidly.

EXAMPLES 11 to 15

Mixes were prepared to the following formulation, aerated to 200% overrun, extruded into beakers and frozen.

|   | % |
|---|---|
| Instant coffee | 5 |
| Sucrose | 32.25 |
| Guar gum | X |
| Water to 100 | |

Table 2 shows the amount of guar gum used:

TABLE 2

| Example | 11 | 12 | 13 | 14 | 15 |
|---|---|---|---|---|---|
| X | 0 | 0.025 | 0.05 | 0.1 | 0.2 |

Table 3 shows the assessment of mix stability (eg whether overrun sustained during extrusions) and product stability.

TABLE 3

| Example | Mix Stability | Product Stability |
|---|---|---|
| 11 | Fair | Fair |
| 12 | Good | Fair |
| 13 | Good | Good |
| 14 | Good | Fair |
| 15 | Good | Fair |

EXAMPLES 16 to 21

Example 13 was repeated except that the sugar was varied as shown in Table 4. The beakers used were of conical shape, of depth 7.3 cms, of surface area 32.2 sq.cms and of area to volume ratio 0.17. Table 4 shows the results in preparation time of the drink on addition of water : the beakers each contained 80 ml of product and had been equilibrated at −20° C. 60mls of cold (about +14° C)water were added. The product was stirred four times on addition of the water and this was repeated after 1 minute.

TABLE 4

| Example | Sugar | Preparation Time |
|---|---|---|
| 13 | Sucrose | 3 min 55 secs |
| 16 | Invert sugar | 3 min 45 secs |
| 17 | 40% Invert/60% sucrose | 2 min 10 secs |
| 18 | 20% Invert/80% sucrose | 2 min 30 secs |
| 19 | 20% Fructose/80% sucrose | 2 min 45 secs |
| 20 | 40% Glucose/60% sucrose | 3 min 5 secs |

TABLE 4-continued

| Example | Sugar | Preparation Time |
|---|---|---|
| 21 | 20% Glucose/80% sucrose | 2 min 35 secs |

EXAMPLES 22 to 29

Example 17 was repeated except that 0.03% of coffee oil and various levels of various proteins were incorporated.

Table 5 shows results with sodium caseinate.

TABLE 5

| Example | 17 | 22 | 23 | 24 | 25 | 26* |
|---|---|---|---|---|---|---|
| % Sodium Caseinate | 0 | 0.03 | 0.05 | 0.1 | 0.5 | 2 |
| Shrinkage[1] | Severe | none | none | slight | 1mm | none |
| Shrinkage[2] | Severe | slight | none | 1mm | 5mm | none |
| Separation of liquor[1] | — | 2mm | none | slight | none | 2mm |
| Separation of liquor[2] | — | slight | none | 6mm | 9mm | slight |

[1] 1 week at $-10°$ C
[2] cycling ($-20°$ C, $-10°$ C and back to $-20°$ C) : 7 cycles allowing 24 hrs at each temperature.
*The sodium caseinate did not disperse adequately in the water ice.

Shrinkage was assessed as the reduction in radius of the exposed surface of the water ice. Separation of liquor was assessed as the height of liquor formed at the bottom of the beaker.

Table 6 shows results using 0.05% of other proteins.

Table 6

| Example | 27 | 28 | 29 |
|---|---|---|---|
| Protein | Hyfoama DS* | Skimmed Milk Powder | Whey Powder |
| Shrinkage[1] | slight | 1mm | slight |
| Shrinkage[2] | 1mm | 1mm | slight |
| Separation[1] | slight | slight | 5mm |
| Separation[2] | slight | 9mm | slight |

[1] and [2] as in Table 5
*Hydrolysed milk protein supplied by Lenderinck

What is claimed is:

1. In a process for preparing a cold flavored drink by adding an aqueous liquid to a frozen flavored concentrate, the improvement which comprises utilizing as the frozen flavored concentrate an ice confection having an overrun in the range 165% to 250%, containing, by weight, not more than 1% emulsified fat, less than 0.5% protein, from 25% to 40% of sugar and from 0.04% to 0.07% of a stabilizer.

2. A process according to claim 1 in which the stabilizer is locust bean gum.

3. A process according to claim 1 in which the sugar is guar gum.

4. A process according to claim 1 in which the sugar comprises invert sugar.

5. A process according to claim 4 in which the sugar is 2:3 mixture of invert sugar and sucrose.

6. A process according to claim 1 in which the ice confection contains protein and an oil in a weight ratio of protein to oil in the range 1:1 to 3:1.

7. A process according to claim 6 in which the protein is selected from the group consisting of sodium caseinate, whey, and partially hydrolized protein.

8. A process according to claim 1 in which the ice confection contains more than about 4% and not more than about 12% water-soluble solids of coffee.

9. A drinking receptacle containing a flavored ice confection with an overrun in the range 165% to 250%, containing, by weight, not more than 1% emulsified fat, less than 0.5% protein, 25% to 40% sugar and 0.04% to 0.07% stabilizer.

* * * * *

UNITED STATES PATENT AND TRADEMARK OFFICE
CERTIFICATE OF CORRECTION

PATENT NO. : 4,039,693
DATED : August 2, 1977
INVENTOR(S) : Donald James Adams et al.

It is certified that error appears in the above-identified patent and that said Letters Patent are hereby corrected as shown below:

Col. 1, line 12, "an" should read --can--;
Col. 1, line 54, delete the comma after "manufacturers";
Col. 1, line 63, "particuarly" should read --particularly--;
Col. 2, line 28, "case" should read --cases--;
Col. 2, line 51, "27%" should read --25%--;
Col. 3, line 17, "add to water" should read --add water--;
Col. 4, line 40, "extrusions" should read --extrusion--; and
Col. 6, line 20, "sugar" should read --stabilizer--.

Signed and Sealed this

First Day of November 1977

[SEAL]

Attest:

RUTH C. MASON
Attesting Officer

LUTRELLE F. PARKER
Acting Commissioner of Patents and Trademarks